United States Patent
Hoke et al.

(10) Patent No.: US 9,631,560 B2
(45) Date of Patent: Apr. 25, 2017

(54) FUEL-AIR MIXTURE DISTRIBUTION FOR GAS TURBINE ENGINE COMBUSTORS

(75) Inventors: James B. Hoke, Tolland, CT (US); William Proscia, Marlborough, CT (US)

(73) Assignee: United Technologies Corporation, Hartford, CT (US)

( * ) Notice: Subject to any disclaimer, the term of this patent is extended or adjusted under 35 U.S.C. 154(b) by 1514 days.

(21) Appl. No.: 13/301,856

(22) Filed: Nov. 22, 2011

(65) Prior Publication Data

US 2013/0125556 A1    May 23, 2013

(51) Int. Cl.

| F02C 7/22 | (2006.01) |
|---|---|
| F02C 9/28 | (2006.01) |
| F02C 7/232 | (2006.01) |
| F23R 3/28 | (2006.01) |
| F23R 3/34 | (2006.01) |
| F02C 7/228 | (2006.01) |

(52) U.S. Cl.
CPC ............... *F02C 9/28* (2013.01); *F02C 7/22* (2013.01); *F02C 7/228* (2013.01); *F02C 7/232* (2013.01); *F23R 3/28* (2013.01); *F23R 3/34* (2013.01); *F05D 2260/964* (2013.01); *F05D 2270/14* (2013.01)

(58) Field of Classification Search
CPC ...... F23R 3/34; F23R 3/28; F02C 7/22; F02C 7/228; F02C 7/232; F02C 9/28
USPC .......... 60/733, 734, 739, 740, 742, 746, 747, 60/39.281, 800
See application file for complete search history.

(56) References Cited

U.S. PATENT DOCUMENTS

| 4,967,562 | A | * | 11/1990 | Shekleton | F23C 5/00 60/738 |
|---|---|---|---|---|---|
| 5,345,757 | A | | 9/1994 | MacLean et al. | |
| 5,402,634 | A | * | 4/1995 | Marshall | 60/776 |
| 5,848,525 | A | | 12/1998 | Spencer | |
| 6,370,863 | B2 | * | 4/2002 | Muller et al. | 60/776 |
| 6,666,029 | B2 | | 12/2003 | Ryan | |
| 6,786,049 | B2 | | 9/2004 | Parsons et al. | |
| 6,915,638 | B2 | * | 7/2005 | Runkle et al. | 60/740 |
| 6,945,053 | B2 | * | 9/2005 | Von Der Bank | 60/776 |
| 6,962,055 | B2 | * | 11/2005 | Chen et al. | 60/746 |
| 6,968,699 | B2 | * | 11/2005 | Howell et al. | 60/776 |
| 7,540,141 | B2 | | 6/2009 | Goldberg et al. | |
| 7,966,995 | B2 | | 6/2011 | Futa, Jr. et al. | |
| 8,348,180 | B2 | * | 1/2013 | Mao et al. | 239/403 |
| 2006/0040225 | A1 | | 2/2006 | Garay et al. | |
| 2007/0105061 | A1 | | 5/2007 | Flohr et al. | |
| 2007/0130911 | A1 | | 6/2007 | Goldberg et al. | |
| 2007/0163267 | A1 | | 7/2007 | Flohr et al. | |
| 2008/0072605 | A1 | | 3/2008 | Hagen et al. | |
| 2008/0256954 | A1 | * | 10/2008 | Dooley | F02C 7/222 60/733 |
| 2009/0077973 | A1 | | 3/2009 | Hu et al. | |

(Continued)

OTHER PUBLICATIONS

European Search Report for European Patent Application No. 12193572 completed Aug. 3, 2016.

*Primary Examiner* — Steven Sutherland
(74) *Attorney, Agent, or Firm* — Carlson, Gaskey & Olds, P.C.

(57) ABSTRACT

A method of noise control from a combustor of a gas turbine engine includes selectively forming a plurality of local circumferential zones with different fuel-air ratios within the combustor.

19 Claims, 5 Drawing Sheets

(56) References Cited

U.S. PATENT DOCUMENTS

| | | |
|---|---|---|
| 2009/0229238 A1 | 9/2009 | Zhang et al. |
| 2010/0043387 A1* | 2/2010 | Myers .................... F02C 7/228 60/39.281 |
| 2010/0050593 A1 | 3/2010 | Futa et al. |
| 2010/0058770 A1 | 3/2010 | Ryan |

* cited by examiner

FUEL-AIR MIXTURE DISTRIBUTION FOR GAS TURBINE ENGINE COMBUSTORS

BACKGROUND

The present disclosure relates to a gas turbine engine and, more particularly, to a combustor operations therefor.

Gas turbine engines, such as those which power modern commercial and military aircraft, generally include a compressor for pressurizing an airflow, a combustor for burning a hydrocarbon fuel in the presence of the pressurized air, and a turbine for extracting energy from the resultant combustion gases. The combustor generally includes radially spaced inner and outer liners that define an annular combustion chamber therebetween. Arrays of circumferentially distributed combustion air holes penetrate multiple axial locations along each liner to radially admit the pressurized air into the combustion chamber. A plurality of circumferentially distributed fuel nozzles project into a forward section of the combustion chamber through a respective fuel nozzle guide to supply the fuel to be mixed with the pressurized air.

Gas turbine engines are effectively designed for low noise with advanced combustors optimized for low NOx emissions. Particular acoustic tones from the combustor may be relative noise contributors since other turbomachinery noise sources have already been significantly reduced.

SUMMARY

A fuel system for a gas turbine engine according to an exemplary aspect of the present disclosure includes a primary fuel manifold operable to communicate fuel to a primary flow jet in each of a plurality of duplex fuel nozzles and a secondary fuel manifold operable to communicate fuel to a secondary flow jet in each of the duplex fuel nozzles and secondary flow jet in each of a plurality of simplex nozzles. An equalizer valve in communication with the primary fuel manifold and the simplex fuel manifold, the equalizer valve movable between an open position and a closed position, the closed position operable to permit supply of the primary fuel manifold with greater fuel pressure than the secondary flow manifold, the open position operable to permit supply of the primary fuel manifold with essentially an equal fuel pressure as the secondary flow manifold.

A method of noise control from a combustor of a gas turbine engine according to an exemplary aspect of the present disclosure includes selectively forming a plurality of local circumferential zones with different fuel-air ratios within the combustor.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
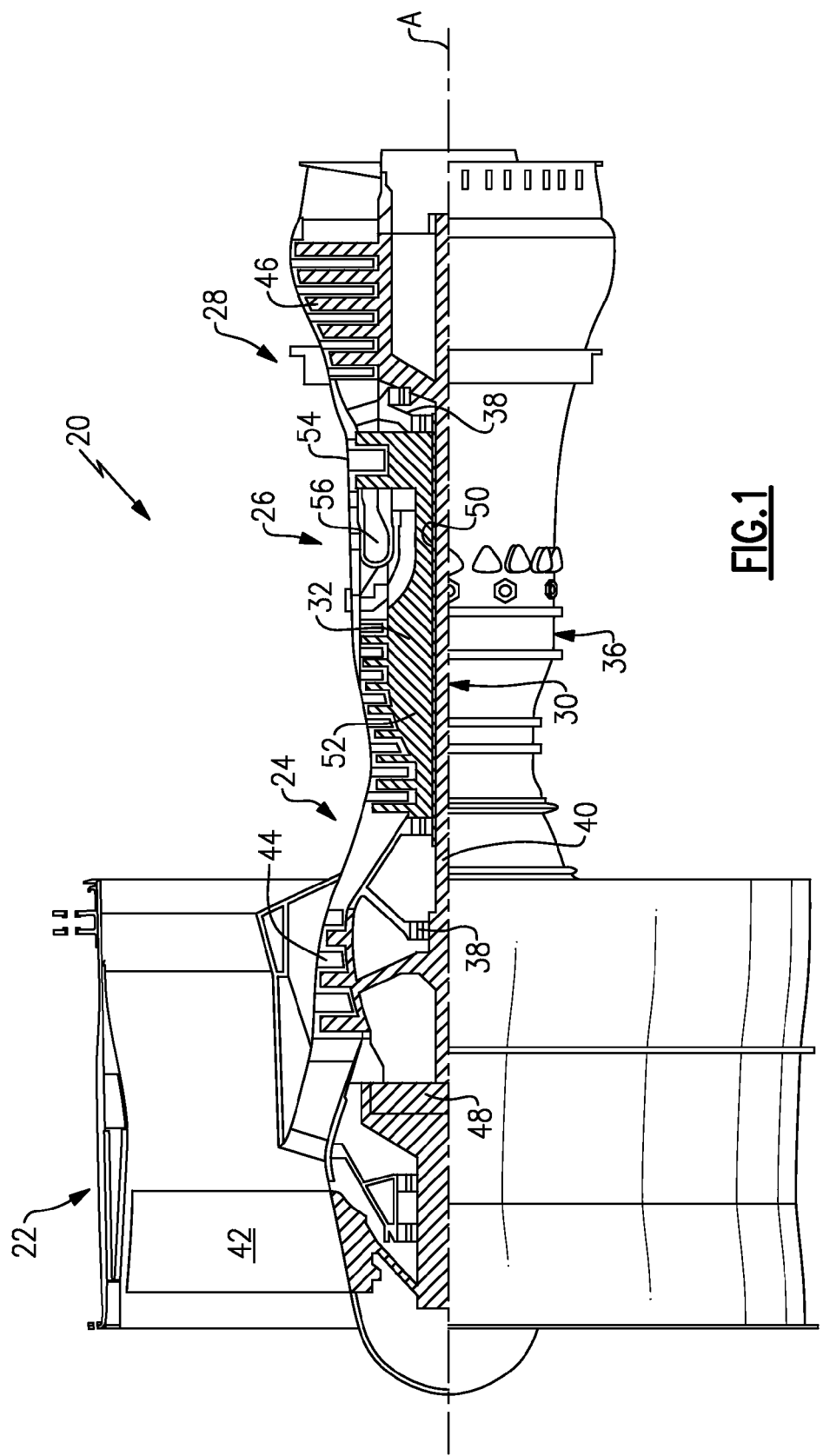
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed and burned with fuel within the combustor 56, then expanded over the high pressure turbine 54 and low pressure turbine 46. The turbines 54, 46 rotationally drive the respective low speed spool 30 and high speed spool 32 in response to the expansion.

Figure 2:
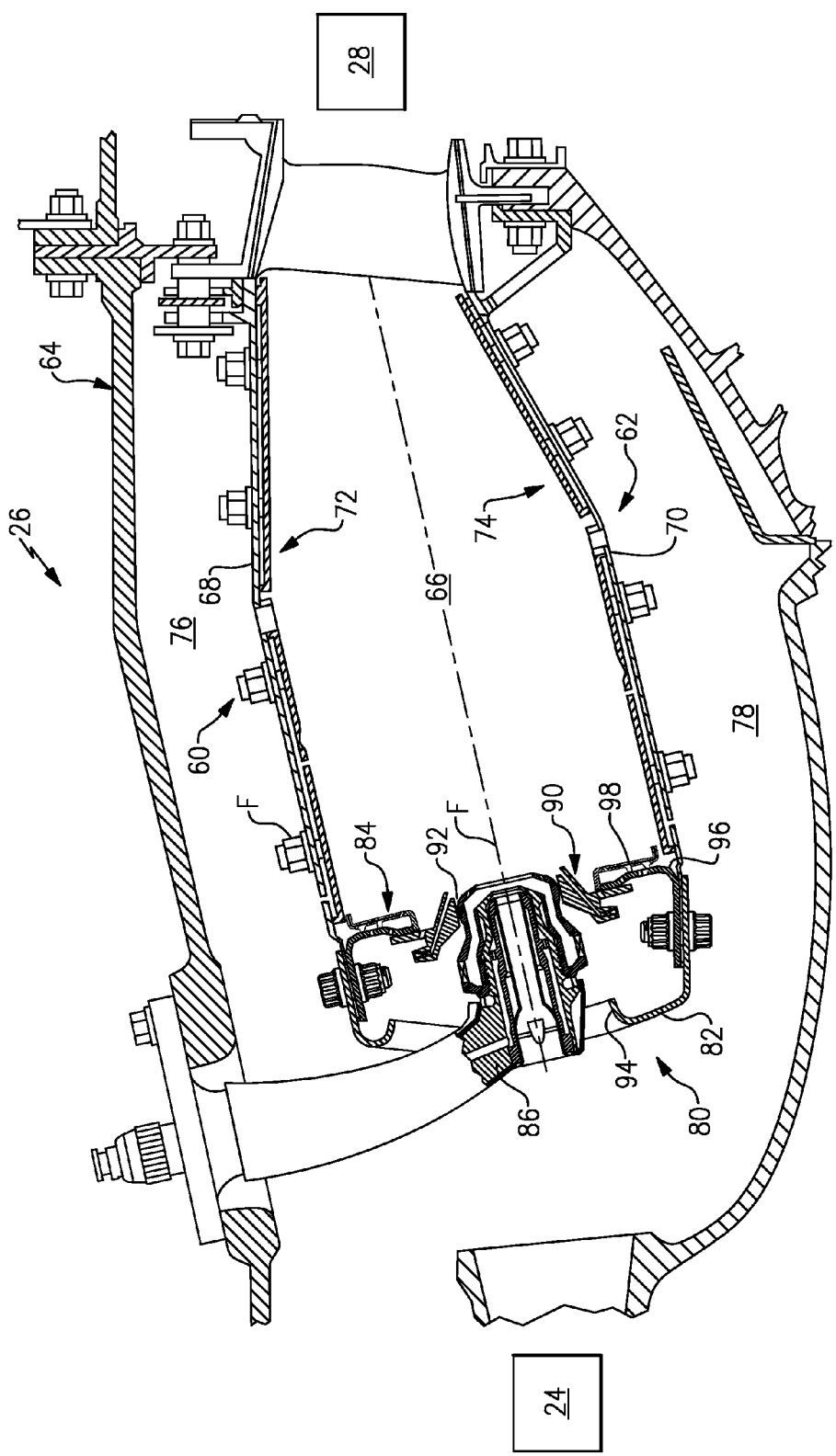
FIG. 2 is a perspective partial sectional view of an exemplary annular combustor that may be used with the gas turbine engine shown in FIG. 1.

With reference to FIG. 2, the combustor 56 generally includes an outer combustor liner 60 and an inner combustor liner 62. The outer combustor liner 60 and the inner combustor liner 62 are spaced inward from a combustor case 64 such that an annular combustion chamber 66 is defined there between. It should be understood that although a particular combustor is illustrated, other combustor types with various liner panel arrangements will also benefit herefrom.

The outer combustor liner 60 and the combustor case 64 define an outer annular plenum 76 and the inner combustor liner 62 and the combustor case 64 define an inner annular plenum 78. The combustor liners 60, 62 contain the flame for direction toward the turbine section 28. Each combustor liner 60, 62 generally includes a support shell 68, 70 which supports one or more liner panels 72, 74 mounted to a hot side of the respective support shell 68, 70. The liner panels 72, 74 define a liner panel array which may be generally annular in shape. Each of the liner panels 72, 74 may be generally rectilinear and manufactured of, for example, a nickel based super alloy or ceramic material.

The combustor 56 further includes a forward assembly 80 immediately downstream of the compressor section 24 to receive compressed airflow therefrom. The forward assembly 80 generally includes an annular hood 82, a bulkhead assembly 84, a multiple of fuel nozzles 86 (one shown) and a multiple of fuel nozzle guides 90 (one shown) that defines a central opening 92. The annular hood 82 extends radially between, and is secured to, the forwardmost ends of the liners 60, 62. The annular hood 82 includes a multiple of circumferentially distributed hood ports 94 that accommodate the respective fuel nozzle 86 and introduce air into the forward end of the combustion chamber 66. Each fuel nozzle 86 may be secured to the outer case 64 and projects through one of the hood ports 94 and through the central opening 92 within the respective fuel nozzle guide 90 along a fuel nozzle axis F.

Figure 3:
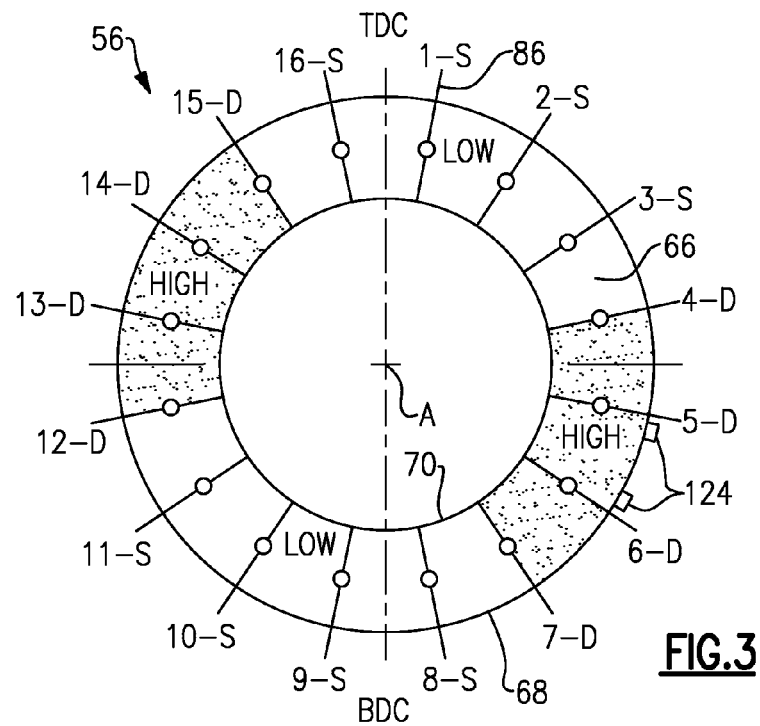
FIG. 3 is a cross sectional schematic view of the exemplary combustor.

With reference to FIG. 3, the multiple of fuel nozzles 86 (sixteen shown) are arranged in the combustor 56. The multiple of fuel nozzles 86 and surrounding structure generate a swirling, intimately blended fuel-air mixture that supports combustion in the forward section of the combustion chamber 66.

Airflow in the combustor 56 is generally uniform and fuel-air variation in the disclosed non-limiting embodiment is selectively generated by the multiple of fuel nozzles 86. The variation is selectively generated through a plurality of duplex fuel nozzles 86D (one shown in FIG. 4) and a plurality of simplex fuel nozzles 86S (one shown in FIG. 5).

Figure 4:
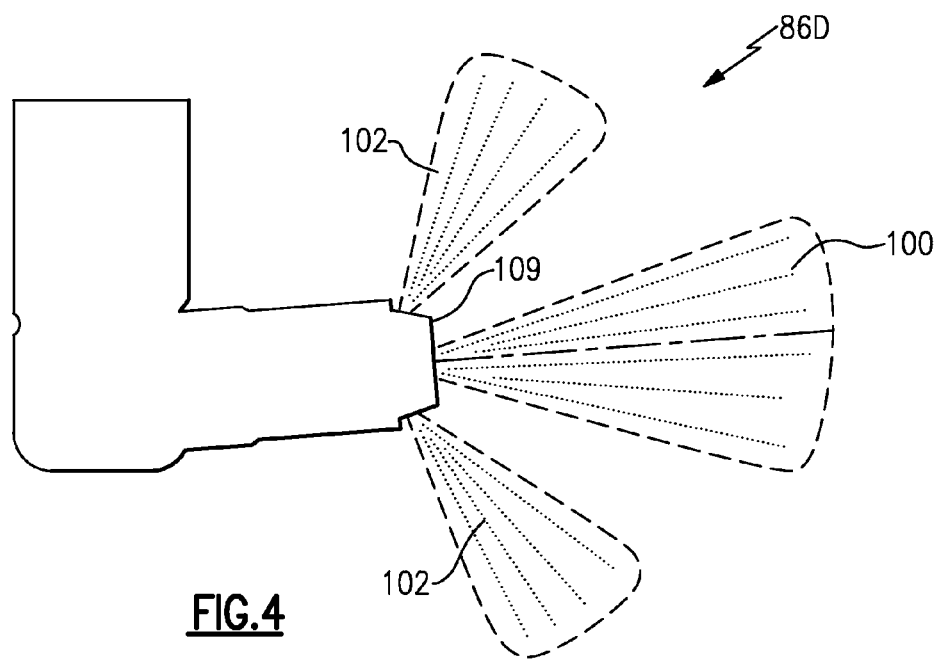
FIG. 4 is a perspective view of a duplex fuel nozzle.
Figure 5:
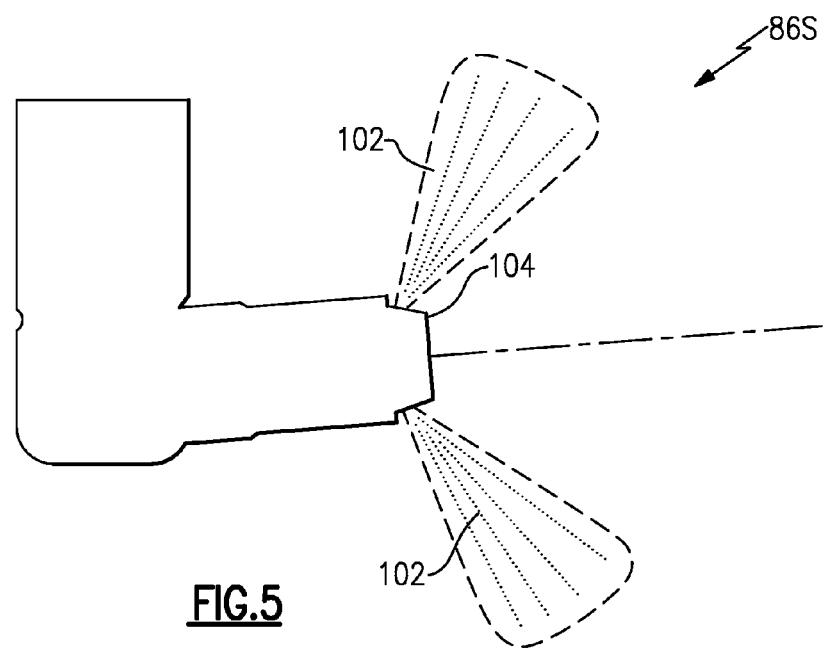
FIG. 5 is a perspective view of a simplex fuel nozzle.

With reference to FIG. 4, each of the duplex fuel nozzles 86D include a primary flow jet 100 and secondary flow jets 102. The primary flow jet 100 is defined generally along axis F and the secondary flow jets 102 are generally transverse to axis F. Each of the simplex fuel nozzles 86S include only the secondary flow jets 102 (FIG. 5). It should be appreciated that various jet arrangements may alternatively or additionally be provided.

Figure 6:
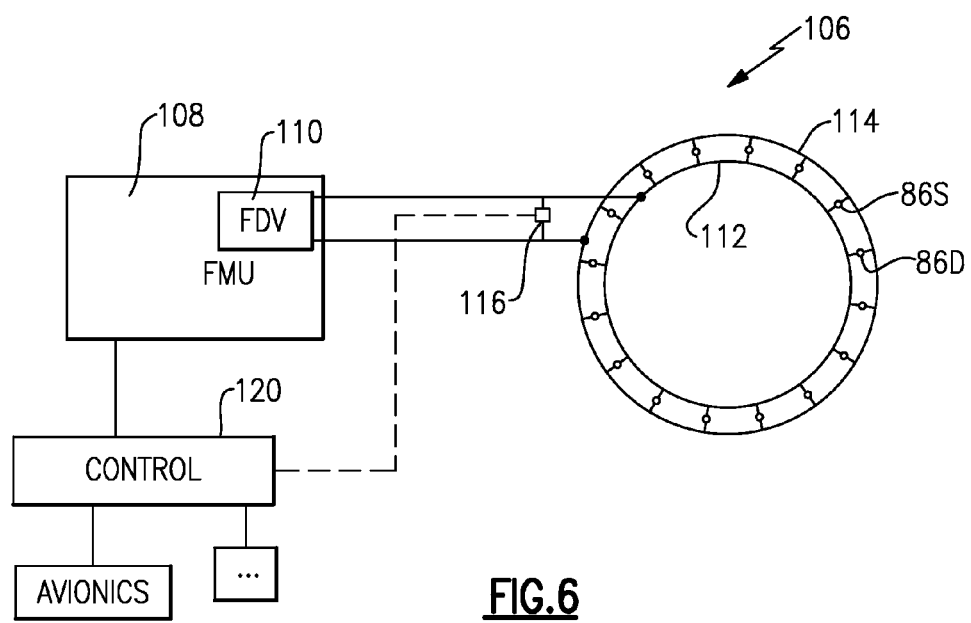
FIG. 6 is a schematic view of a fuel system for the exemplary combustor.

With reference to FIG. 6, a fuel system 106 communicates fuel to the multiple of fuel nozzles 86. The fuel system generally includes a fuel metering unit (FMU) 108, a flow divider valve (FDV) 110, a primary fuel manifold 112, a secondary fuel manifold 114, and an equalizing valve 116 which selectively permits fuel communication between the primary fuel manifold 112 and the secondary fuel manifold 114. The fuel metering unit (FMU) 108 is a hydromechanical unit that controls fuel flow and the flow divider valve (FDV) 110 proportions the fuel flow to the primary fuel manifold 112 and the secondary fuel manifold 114. The primary fuel manifold 112 communicates fuel to the primary flow jet 100 in each of the duplex fuel nozzles 86D and the secondary flow manifold 114 communicates fuel to the secondary flow jets 102 in each of the duplex fuel nozzles 86D and each of the simplex fuel nozzles 86S.

Figure 7:
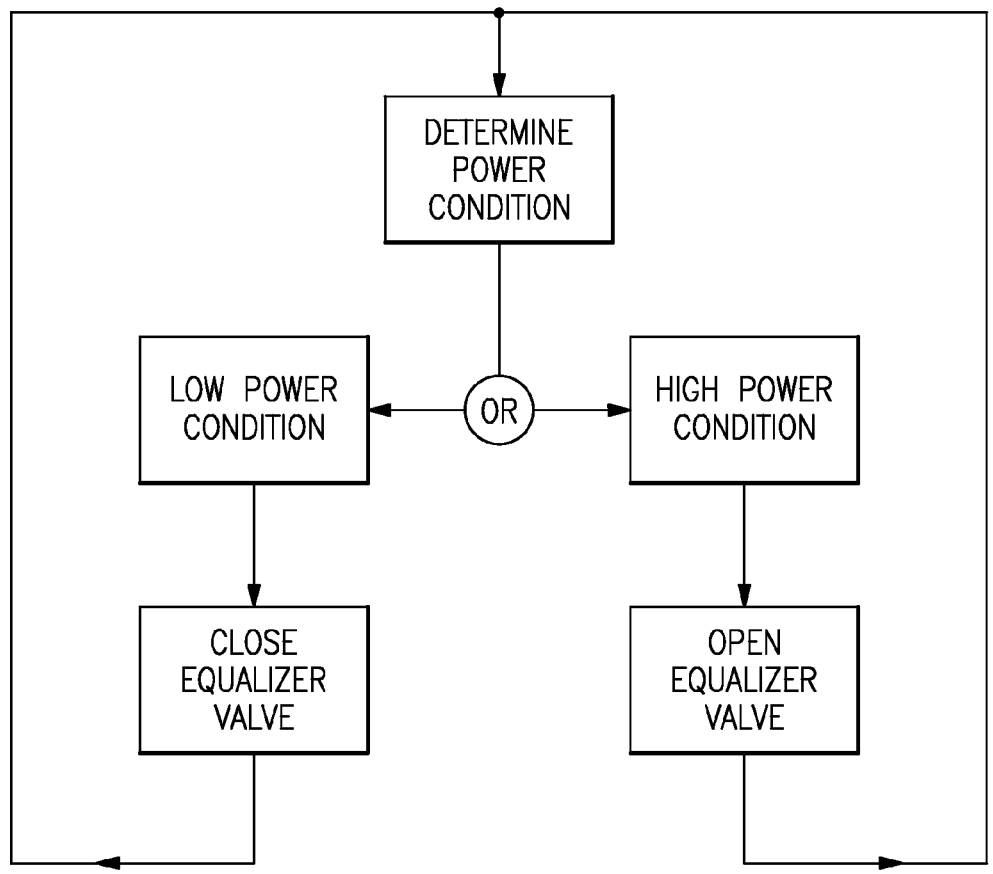
FIG. 7 is a method of operation of the fuel system.

A module 120 executes a fuel control algorithm 122 (FIG. 7). The functions of the algorithm 122 are disclosed in terms of functional block diagrams, and it should be understood by those skilled in the art with the benefit of this disclosure that these functions may be enacted in either dedicated hardware circuitry or programmed software routines capable of execution in a microprocessor based electronics control embodiment. In one non-limiting embodiment, the module 120 may be a portion of a flight control computer, a portion of a Full Authority Digital Engine Control (FDEC) or other system.

The module 120 typically includes a processor, a memory, and an interface. The processor may be any type of known microprocessor having desired performance characteristics. The memory may, for example only, include computer readable medium which stores the data and control algorithms described herein. The interface facilitates communication with the fuel metering unit (FMU) 108, the equalizing valve 116, as well as other avionics and systems.

Reduction in tone amplitude has been demonstrated through the formation of local circumferential zones with different fuel-air ratio mixtures. The different fuel-air ratio mixtures in the alternating circumferential zones as defined by the nozzles 86D, 86S (FIG. 3) vary the delay time of heat release, and consequently provide a differential coupling to the associated naturally occurring acoustic frequencies. That is, high-low-high-low local fuel-air ratios are defined about the circumference of the combustor 56.

The fuel system 106 locates the duplex fuel nozzles 86D adjacent to a set of fuel igniters 124 and opposite the set of fuel igniters 124 (FIG. 6). It should be appreciated that the fuel igniters 124 may be located in other circumferential positions and the duplex fuel nozzles 86D would be adjusted in accordance therewith. That is, if the fuel igniters 124 were mounted at bottom dead center (BDC) at positions 8 and 9, for example, the duplex fuel nozzles 86D would be located in positions 7-10 and 15-2. In the disclosed, non-limiting embodiment of sixteen (16) fuel nozzles 86 where each of the nozzles 86 are separated by 22.5 degrees, the duplex fuel nozzles 86D are located in positions 4-7 and 12-15 while positions 7-12 and 15-4 utilize simplex fuel nozzles 86S.

At low power conditions, the equalizing valve 116 is closed such that the primary fuel manifold 112 is provided with greater fuel pressure than the secondary fuel manifold 114 to drive a fuel flow distortion. The increased fuel pressure drop (and fuel flow) increases the overall (primary plus secondary) fuel flow to the duplex fuel nozzles 86D in relation to the simplex fuel nozzles 86S. That is, when the equalizing valve 116 is closed, the duplex fuel nozzles 86D generate the relatively high fuel-air ratio mixtures and the simplex fuel nozzles 86S provide the relatively low fuel-air ratio mixtures. The varied fuel-air ratio mixtures dampen tangential and axial pressure waves within the combustor 56 to control combustor tones and enhance combustor stability. In one example in which the FMU 108 supplies fuel at approximately 100 psi at a low power condition and approximately 1200 psi at a high power condition, an approximate 50-150 psi difference is provided between the duplex fuel nozzles 86D and the simplex fuel nozzles 86S when the equalizing valve 116 is closed. It should be appreciate that "low power" as defined herein may include moderate power such as that required for approach conditions and a margin above at least partially into a cruise condition.

At non-low power conditions, the equalizing valve 116 is open such that the primary fuel manifold 112 and the secondary flow manifold 114 receive equalized flow such that the duplex fuel nozzles 86D and the simplex fuel nozzles 86S generate a symmetric uniform fuel-air ratio throughout the combustor 56. It should be appreciate that "non-low power" as defined herein may include cruise power conditions and above such as a take-off flight condition.

The equalizing valve 116 allows the selection of fuel asymmetry at low power conditions where combustor tones predominate, and reversion to symmetric operation at high power conditions where uniform fuel-air ratio mixture distribution is desired. The local fuel-air mixture ratio control further facilitates enhanced stability for snap transient decelerations. Selective operation of the equalizing valve 116 thereby reduces tone amplitudes over, for example, idle and approach power settings so that community and aircraft cabin noise are minimized yet selectively permits symmetric high power operation during, for example, cruise power settings to enhance downstream turbine durability.

It should be understood that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A fuel system for a gas turbine engine comprising:
   a plurality of duplex fuel nozzles;
   a plurality of simplex fuel nozzles, wherein said plurality of duplex fuel nozzles and said plurality of simplex fuel nozzles are arranged in alternating groups in a combustor and circumferentially around a central engine axis, said alternating groups defining local circumferential zones in said combustor;
   a primary fuel manifold operable to communicate fuel to a primary flow jet in each of said plurality of duplex fuel nozzles;
   a secondary fuel manifold operable to communicate fuel to a secondary flow jet in each of said plurality of duplex fuel nozzles and a secondary flow jet in each of said plurality of simplex nozzles;
   a flow divider valve operable to proportion fuel flow to said primary fuel manifold and said secondary fuel manifold; and
   an equalizer valve downstream of the flow divider valve and in communication with said primary fuel manifold and said secondary fuel manifold, said equalizer valve movable between an open position and a closed position, said closed position operable to permit supply of said primary fuel manifold with greater fuel pressure than said secondary fuel manifold and said open position operable to permit supply of said primary fuel manifold with essentially an equal fuel pressure as said secondary fuel manifold such that different fuel-air ratios are provided to said local circumferential zones.

2. The fuel system as recited in claim 1, wherein said plurality of duplex fuel nozzles are arranged with respect to a fuel igniter.

3. The fuel system as recited in claim 1, wherein at least one of said plurality of duplex fuel nozzles is arranged circumferentially opposite a fuel igniter.

4. The fuel system as recited in claim 1, wherein said primary flow jet in each of said plurality of duplex fuel nozzles is surrounded by said secondary flow jet.

5. The fuel system as recited in claim 1, wherein one of the groups of said plurality of duplex fuel nozzles is arranged circumferentially adjacent to a fuel igniter and another of the groups of said plurality of duplex fuel nozzles is arranged circumferentially opposite said fuel igniter.

6. The fuel system as recited in claim 1, wherein said primary flow jet is defined along a fuel nozzle axis and said secondary flow jet is transverse to said fuel nozzle axis.

7. The fuel system as recited in claim 1, wherein said equalizer valve bridges said primary fuel manifold and said secondary fuel manifold.

8. A method of noise control from a combustor of a gas turbine engine comprising:
   proportioning fuel flow to a primary fuel manifold and a secondary fuel manifold using a flow diverter valve;
   forming a plurality of local circumferential zones with different fuel-air ratios within the combustor using an equalizer valve located downstream of said flow diverter valve; and
   alternating a plurality of duplex fuel nozzles and a plurality of simplex fuel nozzles to define the plurality of local circumferential zones.

9. The method as recited in claim 8, further comprising: alternating the local circumferential zones with varied fuel-air ratios.

10. The method as recited in claim 9, further comprising: forming the local circumferential zones as a high-low-high-low local fuel-air ratios.

11. The method as recited in claim 8, further comprising: locating at least one of the plurality of duplex fuel nozzles adjacent to a fuel igniter to form at least one high local fuel-air ratio within at least one of the plurality of local circumferential zones.

12. The method as recited in claim 11, further comprising: locating at least one of the plurality of duplex fuel nozzles opposite the fuel igniter to form at least one high local fuel-air ratio within a t least one of the plurality of local circumferential zones.

13. The method as recited in claim 8, further comprising: equalizing a fuel pressure between the primary fuel manifold and the secondary fuel manifold, the primary fuel manifold in communication with a primary flow jet in each of the plurality of duplex fuel nozzles and the secondary fuel manifold in communication with a secondary flow jet in each of the plurality of duplex fuel nozzles and a secondary flow jet in each of the plurality of simplex nozzles.

14. The method as recited in claim 13, further comprising: opening a valve between the primary fuel manifold and the secondary fuel manifold.

15. The method as recited in claim 8, further comprising: dividing a fuel pressure between the primary fuel manifold and the secondary fuel manifold, the primary fuel manifold in communication with a primary flow jet in each of the plurality of duplex fuel nozzles and the secondary fuel manifold in communication with a secondary flow jet in each of the plurality of duplex fuel nozzles and a secondary flow jet in each of the plurality of simplex nozzles.

16. The method as recited in claim 15, further comprising: closing a valve between the primary fuel manifold and the secondary fuel manifold.

17. The method as recited in claim 15, further comprising: forming the plurality of local circumferential zones with varied fuel-air ratios within the combustor in response to a low power condition.

18. The method as recited in claim 8, further comprising: locating one of the plurality of duplex fuel nozzles to be circumferentially adjacent to a fuel igniter and another of the plurality of duplex fuel nozzles to be circumferentially opposite said fuel igniter.

19. The method as recited in claim 8, wherein the equalizer valve bridges the primary fuel manifold and the secondary fuel manifold.

* * * * *